United States Patent [19]
Lauermann et al.

[11] Patent Number: 5,655,613
[45] Date of Patent: Aug. 12, 1997

[54] DRILL BIT

[75] Inventors: Werner Lauermann, Ludesch; Markus Geiger, Röns, both of Austria; Rolf Spangenberg, Gauting, Germany

[73] Assignee: Hilti Aktiengesellschaft, Furstentum, Liechtenstein

[21] Appl. No.: 544,515

[22] Filed: Oct. 18, 1995

[30] Foreign Application Priority Data

Oct. 24, 1994 [DE] Germany .................. 44 37 952.8

[51] Int. Cl.⁶ .................................................. B28D 1/14
[52] U.S. Cl. .................................. 175/403; 299/107
[58] Field of Search ................... 299/107; 175/403; 411/353, 352, 517, 518, 519

[56] References Cited

U.S. PATENT DOCUMENTS

| | | |
|---|---|---|
| 4,427,326 | 1/1984 | Hobson et al. . |
| 4,470,735 | 9/1984 | Salisbury . |
| 5,328,311 | 7/1994 | Knohl ................................ 411/353 |
| 5,352,056 | 10/1994 | Chandler ........................ 411/353 X |

FOREIGN PATENT DOCUMENTS 4243151  6/1994  European Pat. Off. .

OTHER PUBLICATIONS

European Search Report, No. EP 95 810 519.9 dated Mar. 4, 1996.

*Primary Examiner*—William P. Neuder
*Attorney, Agent, or Firm*—Anderson Kill & Olick P.C.

[57] ABSTRACT

A drill bit is formed of an insertion end part (1) and carrier part (2) containing drilling cutter members (8). The insertion end part (1) and the carrier part (2) are joined together by a threaded connection. The two parts are secured by a radially flexible spring washer (7) for preventing an unintended detachment of the two parts.

6 Claims, 2 Drawing Sheets

5,655,613

DRILL BIT

BACKGROUND OF THE INVENTION

The present invention is directed to a drill bit formed of a first or insertion end part and a second carrier part equipped with drilling cutter members, both parts are joined together by a threaded connection with cooperating stop faces disposed on both parts.

Drill bits having a carrier part equipped with drilling cutter members disposed at an angular endface are used for drilling large boreholes in masonry, concrete or rock. When drilling a borehole a core remains which must be subsequently broken off with a suitable tool.

A drill bit disclosed in DE-GM 18 97 841 is composed of an insertion end part and a carrier part equipped with drilling cutter members where the insertion end part and the carrier part are joined together by a threaded connection.

When marketing the above mentioned known drill bits, the carrier parts having different diameters and different insertion end parts are, for logistical reasons, stocked separately, and the carrier parts and the insertion end parts have uniform connecting regions. Accordingly, within the range of a permissible combination, a carrier part desired by customer can be combined with an insertion end part also desired by the customer. Since the cylindrical connection of the drill bits are detachable, there is a possibility that a person not accustomed to taking the drill bit apart, may screw it into the insertion end of a different carrier part. If the combination of the insertion end part and carrier part effected by a person not skilled in the use of the drill bit is not within the limits of the permissible combinations, there is the possibility that an insufficient drill feed may take place or damage to the drill bit or the driving apparatus may occur.

SUMMARY OF THE INVENTION

Therefore, the primary object of the present invention is to provide a drill bit with an insertion end part and a carrier part so that after a proper combination is effected by a person skilled in the use of the drill bit the two parts cannot be separated.

In accordance with the present invention, a circumferential first groove is formed in one of the two parts and a circumferential receiving second groove with a radially flexible spring washer is disposed in the other part, with the spacing of the first groove from a stop face on the part containing the first groove corresponding to the spacing of the receiving second groove from a stop face on the part containing the second groove.

When connecting the carrier part with the insertion end part, they are joined by a threaded connection. The spring washer is radially widened by the part containing the first groove and is at least partially penetrated by the part. When the stop face of the carrier part comes to rest at the stop face of the insertion end part, the widened spring washer rebounds back into the first groove and thus fastens the part comprising the first groove to the part containing the second groove.

Preferably, the part containing the first groove has an outside thread with a length corresponding at most to the spacing of the groove from the stop face of the part in which it is located. This prevents damage of the outside thread on the part containing the first groove if it penetrates the spring washer at least partially.

Preferably, the part containing the first groove has a guide region located between the outside thread and the end of the part extending into the part containing the receiving second groove so that the guide region has a smaller diameter than the core diameter of the outside thread. Accordingly, an inside thread on the part containing the second groove is not damaged by the part containing the first groove and penetrating the spring washer.

To guarantee radial widening of the spring washer, the guide region tapers inwardly towards the adjacent end of the part in which it is formed so that the smallest outside diameter of the guide region is less than the inside diameter of the unstressed spring washer.

In drill bits where the carrier part has a small diameter, the part containing the first groove is formed advantageously by the carrier part and the part containing the receiving groove by the insertion end part.

In drill bits where the carrier part has a large diameter, it is preferable that the part containing the first groove is formed by the insertion end part and part containing the receiving groove is formed by the carrier part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
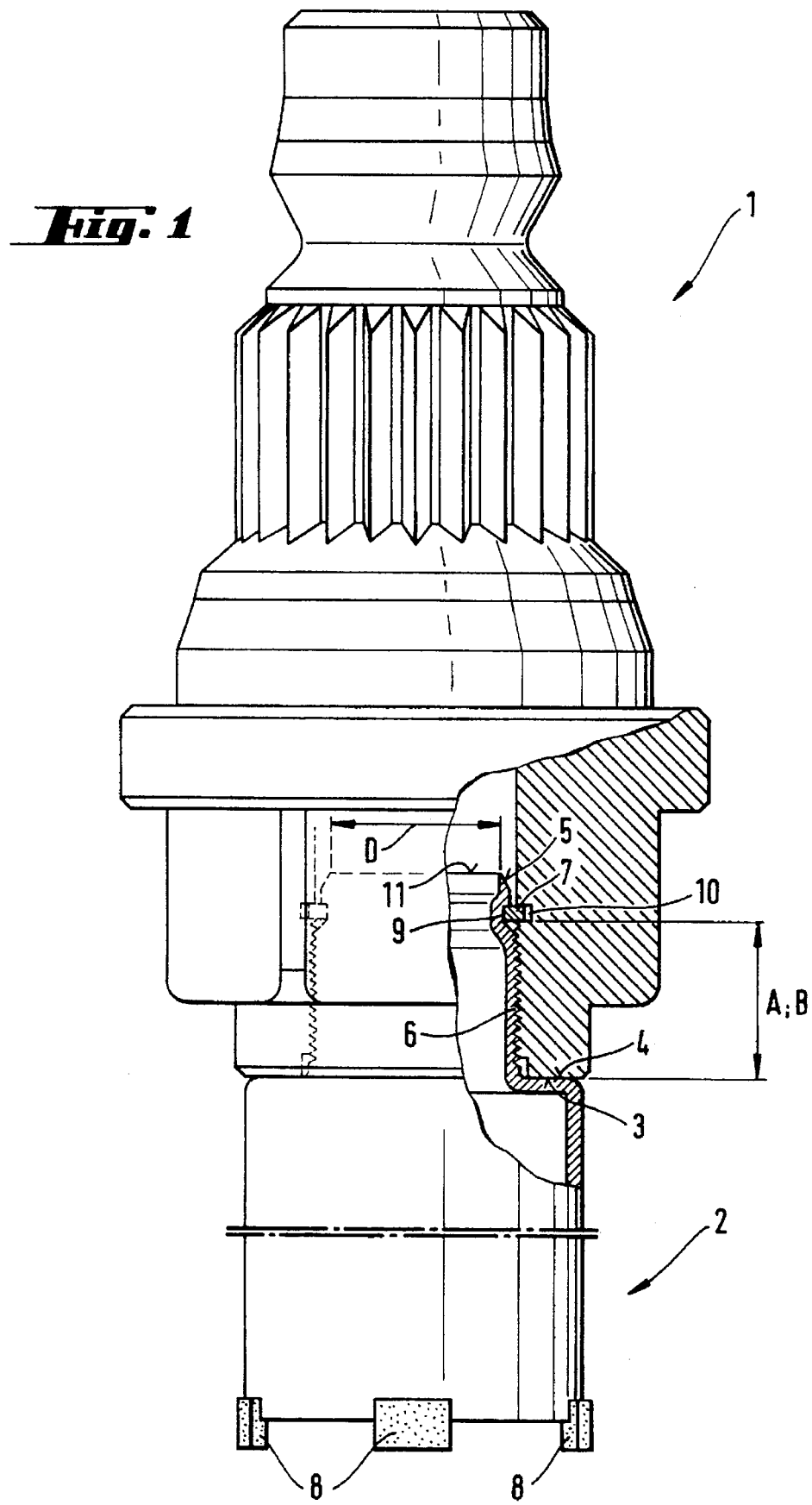
FIG. 1 is an axially extending view of a drill bit, partially in section, embodying the present invention with a carrier part containing a first groove and an insertion end part containing a receiving second groove.

In FIG. 1 an axially extending drill bit is shown formed of an axially extending insertion end part 1 and an axially extending carrier part 2 equipped with drilling cutter members 8 at its first or leading end. In FIG. 1 each of the insertion end part 1 and the carrier part 2 has a first or leading end and second or trailing end. The first and second ends extend transversely of the axially direction of the drill bit. The insertion end part 1 has a first end region extending axially from its first end and the carrier part 2 has an axially extending second end region extending from its second end. In its first end region, the insertion end part 1 has a circumferentially extending receiving second groove 10 formed in a central opening with a radially flexible spring washer 7 inserted into the receiving groove 10. The receiving second groove 10 is spaced in the axial direction from the first end of the insertion end part 1. The insertion end part 1 has a first stop face 3 at its first end and the carrier part 2 has a second stop face 4 spaced axially from its second end. The insertion end part 1 has an inside thread located between the receiving second groove 10 and its first stop face 3. The inside thread on the insertion end part 1 cooperates with an outside thread 6 on the carrier part 2. The outside thread 6 extends from the second stop face 4 to a circumferentially extending first groove 9 adjacent the second end of the carrier part 2. The spacing A of the first groove 9 from the second stop face 4 of the carrier part corresponds to the spacing B of the receiving second groove 10 from the first stop face 3 of the insertion end part 1.

Between the first groove 9 and the second end 11 of the carrier part 2, there is an axially extending guide region 5 having an outside diameter which is less than the core diameter of the outside thread 6. The guide region 5 tapers inwardly towards the second end 11 of the carrier part whereby the least outside diameter D of its second end 11 is less than the inside diameter of the unstressed spring washer 7.

Figure 2:
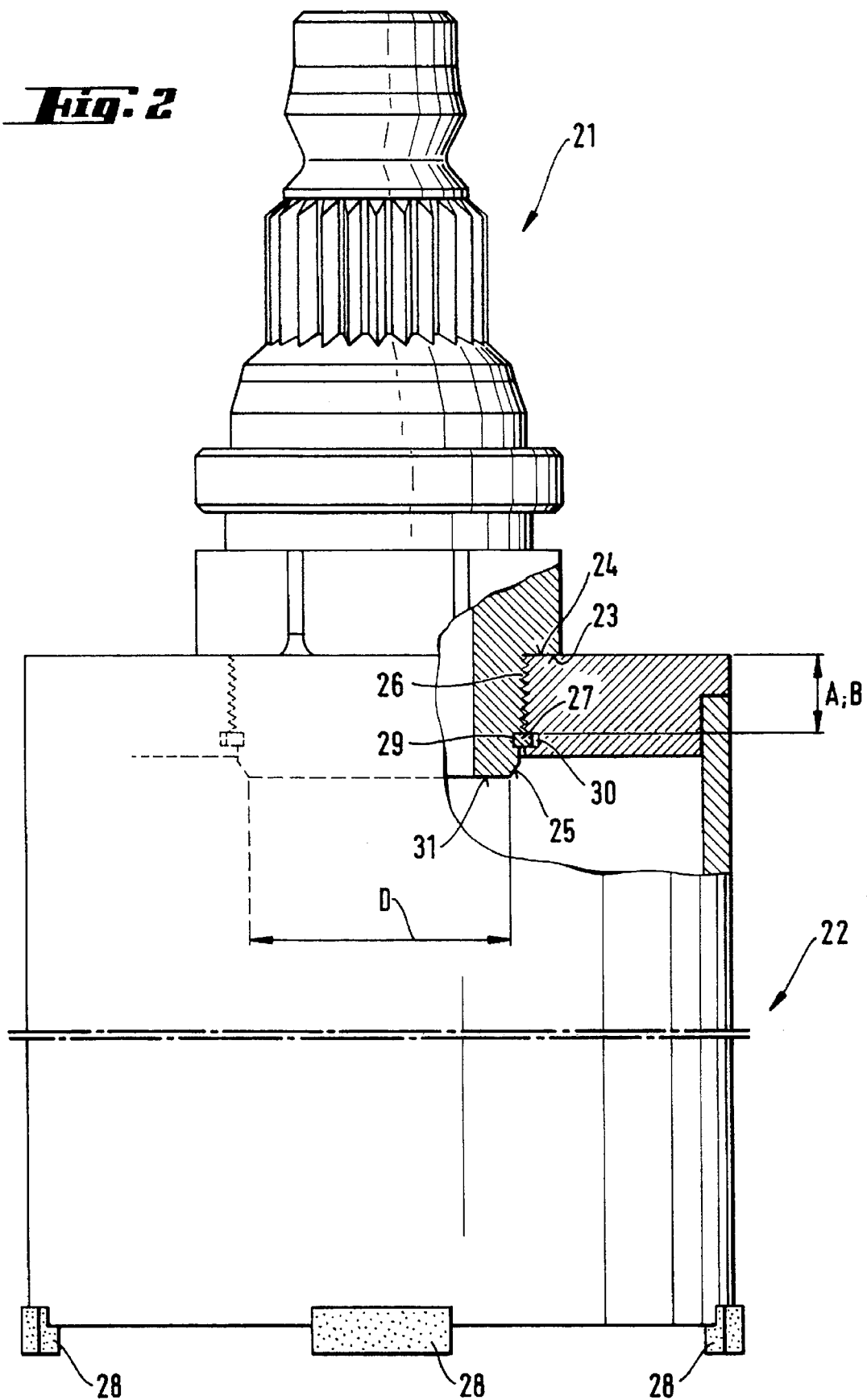
FIG. 2 is an axially extending view of another drill bit embodying the invention with an insertion end part containing the first groove and a carrier part containing the receiving second groove.

In FIG. 2 another drill bit is shown formed of an axially extending insertion end part 21 and an axially extending carrier part 22 equipped with drilling cutter members 28 at its first end. As in FIG. 1, the insertion end part 21 and the carrier part 22 each have a first or leading end, that is the lower end in FIG. 2, and a second or trailing end, that is, the upper end in FIG. 2. The insertion end part 21 and the carrier part 22 are joined together by a threaded connection. The carrier part 22 has a central through opening extending axially from its second end. A circumferentially extending receiving second groove 30 is located in the axially extending second end region of the carrier part 22. The receiving second groove 30 serves for receiving and guiding a radially flexible spring member 27. A through opening in the second end of the carrier part 22 has an inside thread extending axially between the receiving second groove 30 and the second end face. This inside thread cooperates with an outside thread 26 on the insertion end part 21. The outside thread 26 extends from a stop face 23 to a circumferentially extending first groove 29 located in the outside surface of the insertion end part 21. A spacing A of the first groove 29 from a first stop face 23 on the insertion end part 21 corresponds to a spacing B of the receiving second groove 30 from the second stop face 24 on the carrier part 22.

The insertion end part 21 has a guide region 25 extending axially from its first end 31 towards the first groove 29 and the guide region has an outside diameter which is smaller than the core diameter of the outside thread 26. The guide region 25 tapers inwardly to the first end 31 of the insertion end part 21 whereby the smallest outside diameter D at the first end is less then the inside diameter of the unstressed spring washer 27.

While specific embodiments of the invention have been shown and described in detail to illustrate the application of the inventive principles, it will be understood that the invention may be embodied otherwise without departing from such principles.

We claim:

1. A drill bit comprising an axially extending insertion end part (1, 21) having a first end and a second end extending transversely of the axial direction thereof, and an axially extending carrier part (2, 22) having a first end and second end extending transversely of the axially direction thereof, drilling cutter members located in the first end of said carrier part (2, 22), an axially extending first end region of said insertion part (1, 21) being in threaded connection with an axially extending second end region of said carrier part, a circumferentially extending first groove (9, 29) located in one of the said first end region of the said insertion part (1, 21) and said second end region of the said carrier part (2, 22), a circumferentially extending receiving second groove (10, 30) having a radially flexible spring washer (7, 27) inserted therein located in the other one of said first end region of said insertion end part (1, 21) and said second end region of said carrier part (2, 22), said insertion end part (1, 21) having a first stop face (3, 23) in said first end region thereof extending transversely of the axially direction thereof and said second carrier part having a second stop face (4, 24) in said second end region thereof extending transversely of the axial direction thereof, and an axial dimension (A) of said first groove (9, 29) from one of said first stop face of said insertion end part (1, 21) and said second stop face of said carrier part (2, 22) corresponds to an axial dimension (B) of said second groove (10, 30) from the other one of said first stop face of said insertion end part and the second stop face of said carrier part, whereby with said first stop face (3, 23) and said second stop face (4, 24) in surface contact said spring washer interengages said first groove (9, 29) and said second groove (10, 30) and fastens said insertion end part (1, 21) and said carrier part (2, 22) together so that said insertion and carrier parts cannot be separated.

2. A drill bit, as set forth in claim 1, wherein the one of said insertion end part (1, 21) and said carrier part (2, 22) containing the first groove (9, 29) has an outside thread (6, 26) having an axial length corresponding at the most to a spacing (A) of the first groove (9, 29) from one of the first stop face (4) and the second stop face (23).

3. A drill bit, as set forth in claim 2, wherein the one of the insertion end part and the carrier part containing the first groove (9, 29) has a guide region (5, 25) extending between an outside thread (6, 26) and the adjacent one of the first end of the insertion end part (1, 21) and the second end of said carrier part (2, 22), and said guide region (5, 25) having an outside diameter smaller than a core diameter of the outside thread (6, 26).

4. A drill bit, as set forth in claim 3, wherein the guide region (5, 25) tapers inwardly towards one of the first end of said insertion end part and the second end of said carrier part with the least outside diameter (D) of the guide region (5, 25) being less than an inside diameter of the unstressed spring washer (7, 27).

5. A drill bit, as set forth in one of claims 1–4, wherein said first groove (9) is formed in said carrier part (2) and said receiving second groove (10) is formed in said insertion end part (1).

6. A drill bit, as set forth in one of claims 1–4, wherein said first groove (29) is formed in said insertion end part (21) and said receiving second groove (30) is formed in said carrier part (22).

* * * * *